United States Patent [19]

Kanamaru

[11] Patent Number: 4,736,782

[45] Date of Patent: Apr. 12, 1988

[54] PNEUMATIC TIRE TREAD

[75] Inventor: Masahiko Kanamaru, Zushi, Japan

[73] Assignee: The Yokohama Rubber Co., Ltd., Tokyo, Japan

[21] Appl. No.: 798,278

[22] PCT Filed: Dec. 10, 1984

[86] PCT No.: PCT/JP84/00582

§ 371 Date: Nov. 8, 1985

§ 102(e) Date: Nov. 8, 1985

[87] PCT Pub. No.: WO85/04135

PCT Pub. Date: Sep. 26, 1985

[30] Foreign Application Priority Data

Mar. 9, 1984 [JP] Japan .................................. 59-43889

[51] Int. Cl.$^4$ ............................................ B60C 11/06
[52] U.S. Cl. ................................................. 152/209 R
[58] Field of Search ............. 152/209 R, 209 D, D12, 152/142, 143, 145

[56] References Cited

U.S. PATENT DOCUMENTS 3,450,182 6/1969 Verdier ........................... 152/209 R
3,831,654 8/1974 Boileau ........................... 152/209 R
4,122,879 10/1978 Takigawa et al. ............... 152/209 R

FOREIGN PATENT DOCUMENTS 4150178 5/1979 Australia .

Primary Examiner—Michael Ball
Attorney, Agent, or Firm—Armstrong, Nikaido, Marmelstein & Kubovcik

[57] ABSTRACT

In a pneumatic tire having at least 3 zigzag grooves formed on the tread surace, in the zigzag groove (Ms) formed on the side of the shoulder portion, the ratio (Hs/W) of the point height (Hs) to the tread width (W) is adjusted in the range of from 2% to 4% and in the zigzag groove (Mc) formed on the side of the tread center portion, the ratio (Hc/W) of the point height (Hc) to the tread width (W) is adjusted in the range of from 6% to 10%, whereby the wet braking capacity of the pneumatic tire can be improved without reduction of the abrasion resistance of the tire.

1 Claim, 9 Drawing Sheets

PNEUMATIC TIRE TREAD

TECHNICAL FIELD

The present invention relates to a pneumatic tire. More particularly, the present invention relates to a ribbed pneumatic tire for high speed driving, which is used for a heavy-load vehicle such as a heavy truck, a bus or a light truck.

BACKGROUND ART

In the field of ribbed pneumatic tires for high-speed driving in heavy-load vehicles, trials have been carried out to improve braking capacity on a wet road, that is, the wet braking capacity, without reduction of the abrasion resistance by making complex tread patterns.

These trials are roughly divided into the following two means.

(1) Many continuous zigzag grooves extending in the circumferential direction of a tire are formed on the tread surface of the tire while leaving spaces in the lateral direction.

(2) The point height Hm of the many zigzag grooves formed on the tread surface of a tire is increased.

However, these means involve problems as described below.

(a) In the above-mentioned means (1), the braking effect depends on the number and width of the zigzag grooves arranged on the tread surface of the tire. Accordingly, if many grooves having a broad width are arranged in a limited ground-contacting region to improve the braking effect, the actual ground-contacting area of the tire T is decreased and the abrasion resistance is reduced. Furthermore, if the groove width is increased, abnormal abrasion, known as "rib punching", occurs and the abrasion resistance of the tire is drastically reduced.

(b) The above-mentioned means (2) is advantageous over the means (1) in that the braking effect can be improved without increasing the number and width of the grooves. However, since the width of ribs Rs formed on the side of the shoulder portion is greatly changed with the increase of the point height Hm of the grooves, abnormal abrasion, known as "wavy abrasion", occurs, also, in the means (2), the abrasion resistance of the tire is drastically reduced. Moreover, the riding comfort and driving stability are reduced.

DISCLOSURE OF THE INVENTION

It is a primary object of the present invention to provide a pneumatic tire in which the wet braking capacity is improved without reduction of the abrasion resistance.

More specifically, in accordance with the present invention, there is provided a pneumatic tire having at least 3 zigzag grooves continuous in the circumferential direction of the tire, which are formed on the tread surface of the tire while leaving spaces in the lateral direction, wherein, in the zigzag groove located on the side of the shoulder portion, the ratio of the point height Hs to the tread width W is in the range of from 2% to 4%, and in the zigzag groove located on the side of the tread center portion, the ratio of the point height Hc to the tread width W is in the range of from 6% to 10%.

BEST MODE FOR CARRYING OUT THE INVENTION

Figure 1:
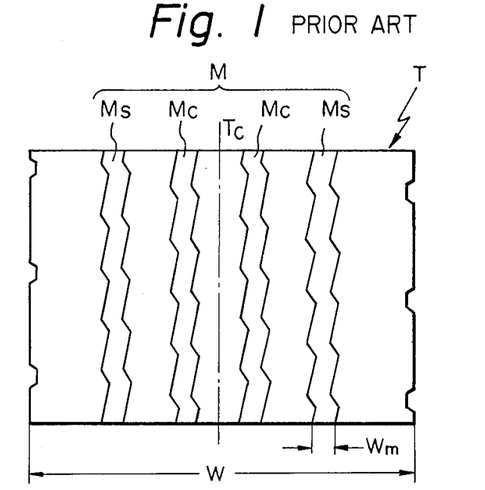
FIG. 1 is a development diagram of the tread pattern of a conventional pneumatic tire having many zigzag grooves formed on the tread surface.
Figure 3A:
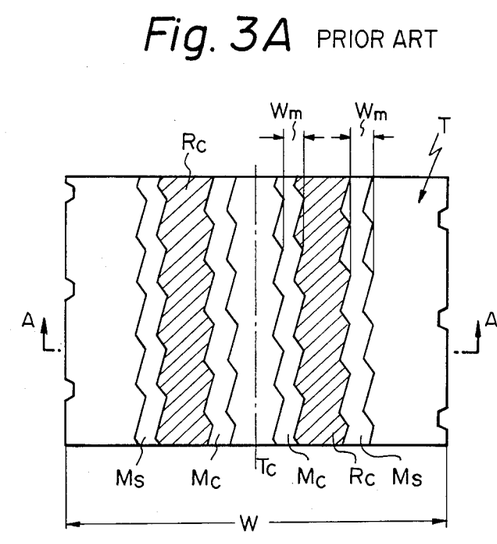
FIG. 3A is a development diagram of the pattern showing abnormal abrasion (especially rib punching) caused in the conventional pneumatic tire shown in FIG. 1.
Figure 3B:
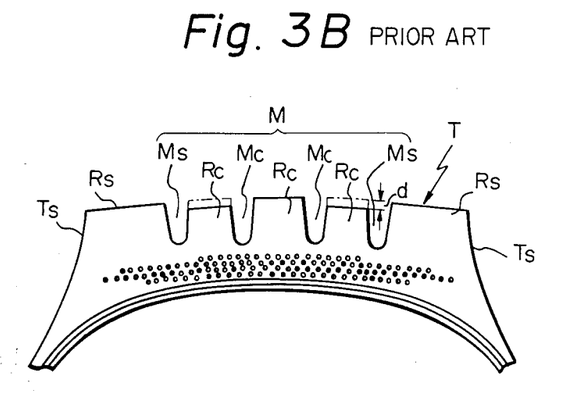
FIG. 3B is a diagram illustrating the section (main part only) of a part of the tire of FIG. 3A seen along the line A—A in FIG. 3A.

On the tread surface T of the conventional tire shown in FIG. 1, a plurality of zigzag grooves M (Mc, Ms) extending continuously in the circumferential direction of the tire are formed while leaving spaces in the direction of the width W of the tire. These grooves M have a width Wm, and all the grooves M have the same shape. In the conventional tire having this tread surface, as pointed out hereinbefore, the braking effect of the tire is increased by increasing the width Wm, but as shown in FIGS. 3A and 3B, abnormal abrasion is increased in the rib Rc between the grooves Ms and Mc.

Figure 2:
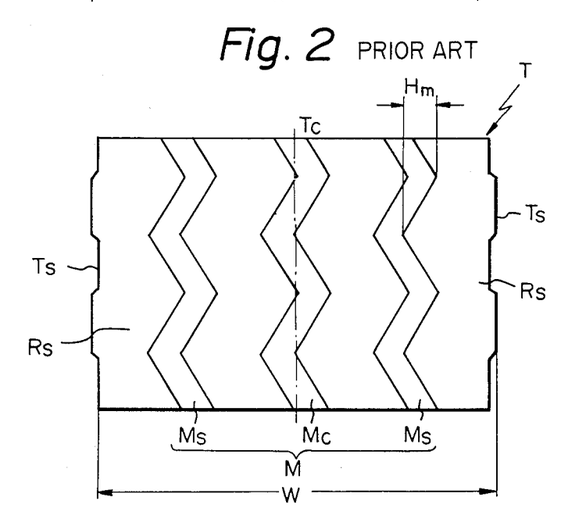
FIG. 2 is a development diagram of the tread pattern of a conventional pneumatic tire having zigzag grooves having a large point height, which are formed on the tread surface of the tire.
Figure 5A:
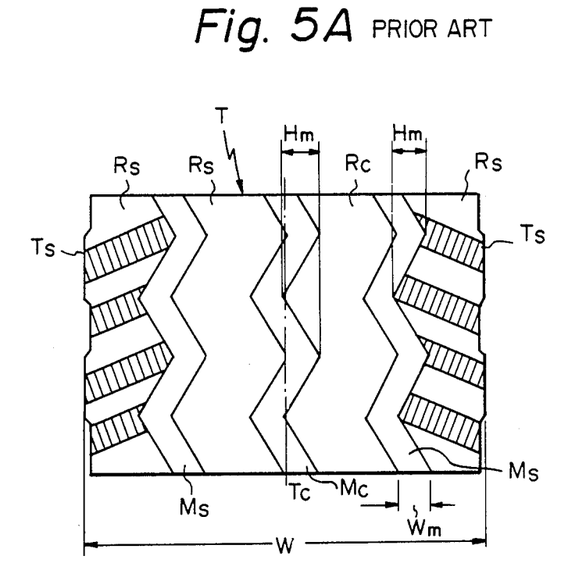
FIG. 5A is a development diagram of a pattern showing abnormal abrasion (especially wavy abrasion) caused in the conventional pneumatic tire shown in FIG. 2.
Figure 5B:
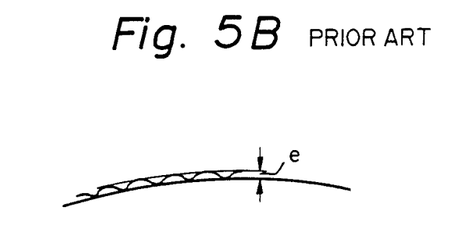
FIG. 5B is a diagram illustrating the above-mentioned wavy abrasion.

On the tread surface of another conventional tire shown in FIG. 2, a plurality of zigzag grooves M (Mc, Ms) extending continuously in the circumferential direction of the tire are formed in the shoulder portion Ts and the center portion Tc while leaving spaces in the direction of the width W of the tire, and the point height Hm of the grooves M is larger than in the tire shown in FIG. 1. If the point height Hm of the grooves M is thus increased, the braking effect of the tire is enhanced, but the width of the rib Rs of the shoulder portion Ts of the tire is greatly changed along the circumferential direction of the tire. Accordingly, as shown in FIGS. 5A and 5B, wavy abnormal abrasion on the rib Rs of the tire becomes large.

In view of the foregoing problems involved in the conventional tires, we carried out research to find a tread pattern capable of improving the braking capacity on a wet road, that is, the wet braking capacity, without reduction of the abrasion resistance in a ribbed pneumatic tire for high-speed driving in a heavy-load vehicle. Namely, we made the following experiments on the ratio of the point height Hm to the tread width W and the ratio of the groove width Wm to the tread width W in zigzag grooves of the above-mentioned pneumatic tire.

For the experiments, pneumatic tires having the following specification, which differed in the ratio of the high point Hm to the tread width W and the ratio of the groove width Wm to the tread width W, were prepared, and these tires were tested in connection with the abrasion resistance and the wet braking capacity.

The specification of the tires used for the experiments and the test conditions were as described below.

Actual Vehicle Abrasion Test
Tire size: 10.00R20 14PR
Inner pressure: 7.25 kg/cm$^2$
Rim: 7.50 V×20
Load: 2500 Kg
Road surface: 100% paved road
Driving distance: 35000 km
Driving speed: 30–80 km/hr
Wet Braking Capacity Test
Tire size: 10.00R20 14RP
Inner pressure: 7.25 kg/cm$^2$
Rim: 7.50 V×20
Load: no load
Measurement method: braking distance on wet road surface was measured according to JIS D-1013

EXPERIMENT 1

The abrasion resistance and wet braking capacity were tested by using pneumatic tires of the above specification differing in the ratio Hm/W (%) of the point height Hm to the tread width W.

Figure 6A:
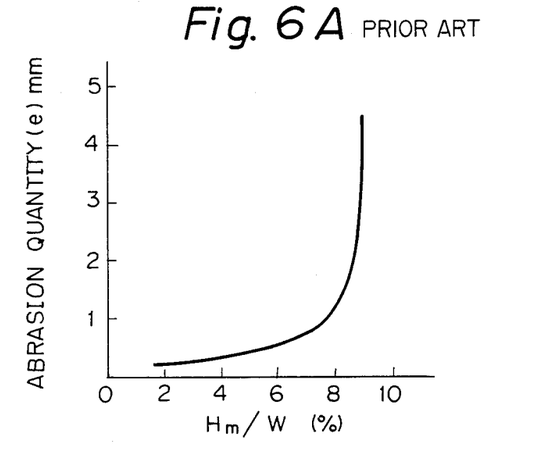
FIG. 6A is a graph illustrating the relationship between the ratio Hm/W (%) of the point height Hm of the tire to the tread width W and the abrasion quantity e (mm) of wavy abrasion caused in the rib Rs on the side of the shoulder portion Ts of the tire T.
Figure 6B:
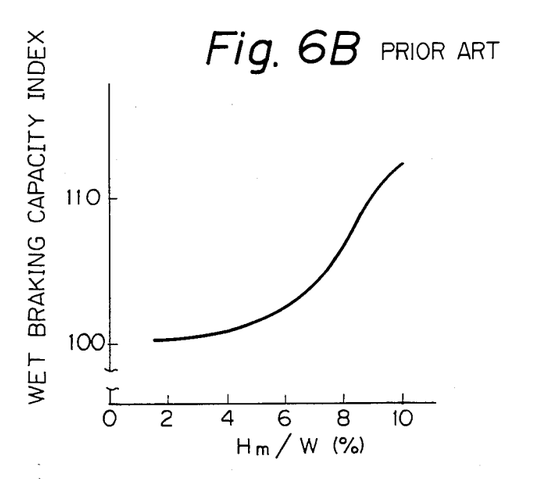
FIG. 6B is a graph illustrating the relationship between the ratio Hm/W (%) of the point height Hm of the tire to the tread width W and the wet braking capacity (index)

The test results obtained are shown in FIGS. 6A and 6B.

FIG. 6A illustrates the relationship between the ratio Hm/W (%) of the point height Hm to the tread width W and the abrasion quantity e (mm) of wavy abrasion caused in the rib Rs on the side shoulder portion Ts of the tire T. FIG. 6B illustrates the relationship between the ratio Hm/W (%) of the point height Hm to the tread width W and the wet braking capacity (index).

From these experimental results, it was found that although the wet braking capacity is improved with increase of the ratio Hm/W of the point height Hm to the tread width W (see FIG. 6B), the abrasion quantity e of wavy abrasion caused in the rib Rs on the side of the shoulder portion Ts of the tire T is drastically increased with an increase of the ratio Hm/W (see FIG. 6A), and that when the ratio Hm/W is within the range not causing a reduction of the abrasion resistance, a satisfactory improvement of the wet braking capacity cannot be obtained.

EXPERIMENT 2

The abrasion resistance and wet braking capacity were tested by using pneumatic tires of the above specification differing in the ratio Wm/W (%) of the groove width Wm to the tread width W.

Figure 4A:
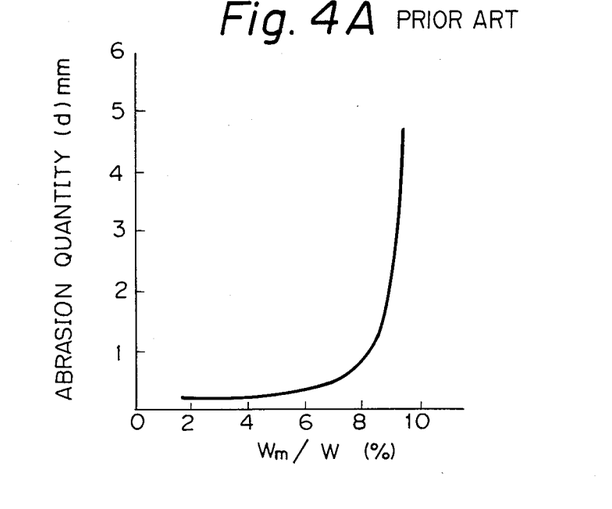
FIG. 4A is a graph illustrating the relationship between the ratio Wm/W (%) of the groove width Wm of the tire to the tread width W and the abrasion quantity d (mm) of rib punching caused in the rib Rc on the side of the center portion Tc of the tire T.
Figure 4B:
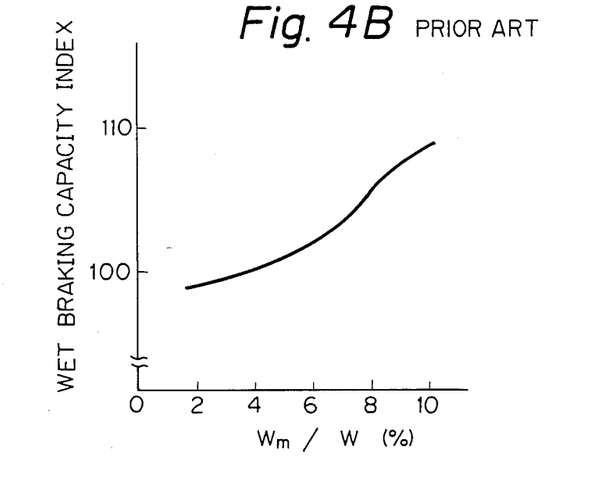
FIG. 4B is a graph illustrating the relationship between the ratio Wm/W (%) of the groove width Wm of the tire to the tread width W and the wet braking capacity (index)

The test results obtained are shown in FIGS. 4A and 4B.

FIG. 4A illustrates the relationship between the ratio Wm/W (%) of the groove width Wm to the tread width W and the abrasion quantity d (mm) of rib punching caused in the rib Rc on the side of the tread center portion Tc of the tire T. FIG. 4B illustrates the relation between the ratio Wm/W (%) of the groove width Wm to the tread width W and the wet braking capacity (index).

From these test results, it was found that although the wet braking capacity is improved with increase of the ratio Wm/W (%) of the groove width Wm to the tread width W (see FIG. 4B), the abrasion quantity d of rib punching is drastically increased with an increase of the ratio Wm/W (see FIG. 4A) because the rib width of the rib Rc on the side of the tread center portion Tc is decreased with an increase of the ratio Wm/W, and that if the ratio Wm/W is in the range not causing a reduction of the abrasion resistance, a satisfactory improvement of the wet braking capacity cannot be obtained.

From the results of Experiments 1 and 2, it was confirmed that the means of increasing the ratio Hm/W of the point height Hm to the tread width W and the means of increasing the ratio Wm/W (%) of the groove width Wm to the tread width W are effective for improving the wet braking capacity, but each of these means causes a drastic reduction in the abrasion resistance.

In other words, it was found that so long as zigzag grooves having an equal point height are arranged on the tread surface, as in the conventional pneumatic tires shown in FIGS. 1 and 2, it is impossible to simultaneously satisfy the abrasion resistance and wet braking capacity, which properties are incompatible with each other.

We carried out further research based on the above-mentioned experimental results and, as a result, it was found that in a ribbed pneumatic tire for high speed driving in a heavy-load vehicle, which has zigzag grooves continuous in the circumferential direction of the tire and formed on the tread surface of the tire, if the ratio of the point height to the tread width in the groove located on the side of the shoulder portion is decreased to prevent reduction of the abrasion resistance and the ratio of the point height to the tread width in the groove located on the side of the tread center portion is increased to improve the wet braking capacity, the braking capacity on a wet road, that is, the wet braking capacity, can be greatly improved without a reduction in the abrasion resistance.

The present invention will now be described in detail with reference to embodiments illustrated in the accompanying drawings.

Figure 7:
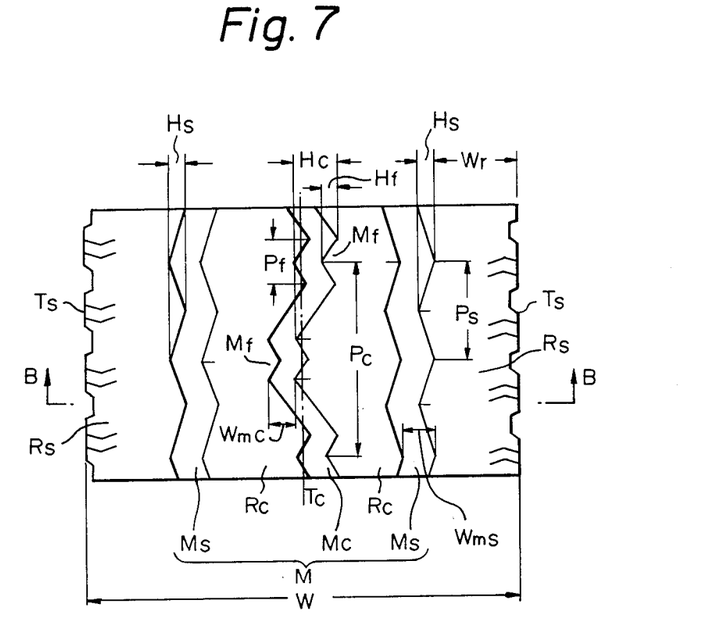
FIG. 7 is a development diagram of the tread pattern of a pneumatic tire according to one embodiment of the present invention.
Figure 8:
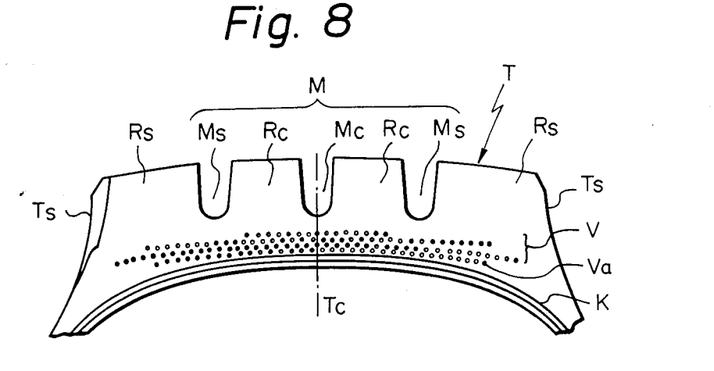
FIG. 8 is a diagram illustrating the section (main part only) of a part of the tire of FIG. 7 seen along the line B—B in FIG. 7.
Figure 9:
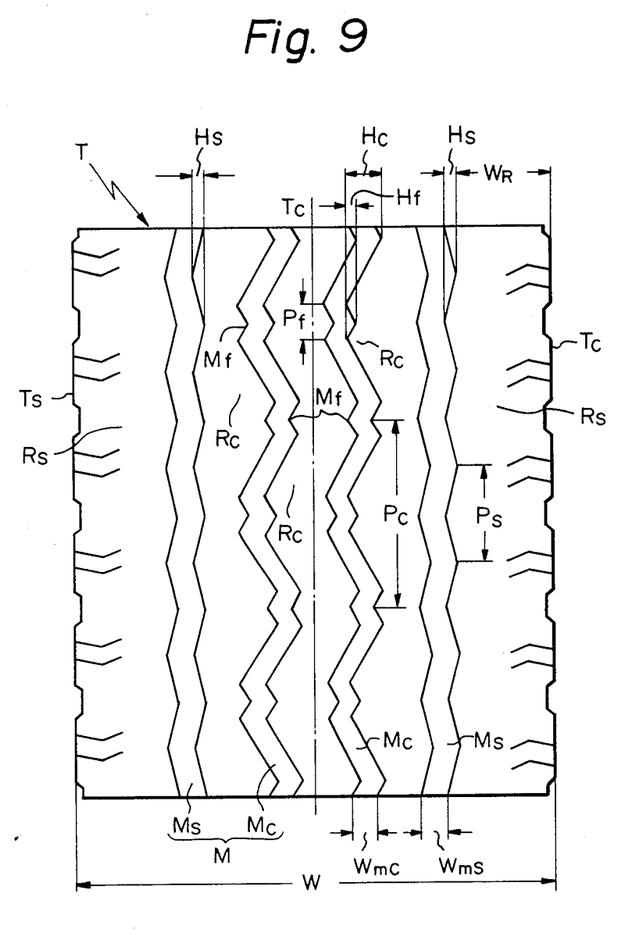
FIG. 9 is a development diagram of the tread pattern of a pneumatic tire according to another embodiment of the present invention.

FIGS. 7 through 9 illustrate embodiments of the pneumatic tire of the present invention. FIG. 7 is a development diagram of the tread pattern of a pneumatic tire according to one embodiment of the present invention, FIG. 8 is a diagram showing the section (main part only) of the tire of FIG. 7 seen along the line B—B in FIG. 7, and FIG. 9 is a development diagram of the tread pattern of a pneumatic tire according to another embodiment of the present invention.

As shown in FIGS. 7 through 9, in the pneumatic tire of the present invention, at least 3 zigzag grooves M (Mc, Ms) continuous in the circumferential direction of the tire are formed on the tread surface of the tire T while leaving spaces in the lateral direction. Of these zigzag grooves, the groove Ms located on the side of the shoulder portion Ts is characterized in that the ratio of the point height Hs to the tread width W is 2 to 4%, and the groove Mc located on the side of the tread center portion Tc is characterized in that the ratio of the point height Hc to the tread width W is 6 to 10%.

Moreover, in the tires shown in FIGS. 7, 8, and 9, each of the ratio of the groove width Wms to the tread width W in the groove Ms located on the side of the shoulder portion Ts and the ratio of the groove width Wmc to the tread width W in the groove Mc located on the side of the tread center portion Tc is set at 5 to 8%. Furthermore, the ratio Pc/Ps of the pitch length Pc of the groove Mc located on the side of the tread center portion Tc to the pitch length Ps of the groove Ms located on the side of the shoulder portion Ts is set at 2.

This structure will now be described in more detail. In the tire of the present invention according to the embodiment shown in FIGS. 7 and 8, the above-mentioned zigzag grooves M include three grooves, that is, one zigzag groove Mc formed in the tread center portion Tc and left and right two zigzag grooves Ms formed in the shoulder portions Ts on both the sides of this groove Mc while leaving certain spaces from the groove Mc. In the grooves Ms, the ratio Hs/W of the point height Hs to the tread width W is set at 3%, and in the groove Mc, the ratio Hc/W of the point height Hc to the tread width W is set at 9%. Each of the ratio Wms/W of the groove width Wms of the grooves Ms to the tread width W and the ratio Wmc/W of the groove width Wmc of the groove Wc to the tread width W is set at 6%. The ratio Pc/Ps of the pitch length Pc of the groove Mc to the pitch length Ps of the grooves Ms is set at 2, and the ratio Wr/W of the rib width Wr of the rib Rs on the side of the shoulder portion Ts to the tread width W is set at 20%.

Furthermore, as shown in FIGS. 7 and 8, the groove Mc formed in the tread center portion Tc has a zigzag bending having a waveform of a large frequency and small bendings Mf located at the respective apexes of the large zigzag bending.

If small bendings Mf are thus formed at the respective apexes of the zigzag bending having a waveform of a large frequency in the groove Mc arranged in the tread center portion Tc, abrupt variation of the rib width of the rib Rc on the side of the tread center portion Tc can be greatly moderated and abnormal abrasion such as railway abrasion can be prevented. Therefore, the point height Hc of the groove Mc can be substantially increased, and the braking effect can be further improved.

It is preferred that the ratio Hf/Hc of the point height Hf of each bending Mf to the point height Hc of the groove Mc be 0 to 30%, especially 15 to 30%, and it also is preferred that the ratio Pf/Pc of the pitch length Pf of each bending Mf to the pitch length Pc of the groove Mc be 0.1 to 0.25, especially 0.15 to 0.25.

Note, in the tire shown in FIGS. 7 and 8, the ratio Hf/Hc is set at 26% and the ratio Pf/Pc is set at 0.21.

By forming the bendings Mf at the respective apexes of the zigzag bending of a large-frequency wave form as described hereinbefore, occurrence of a stone-biting phenomenon in the zigzag groove arranged in the tread center portion Tc can be prevented and a good appearance can be given to the tread pattern.

Note, in FIG. 8, symbol V represents a plurality of belt layers, each having a reed screen-like structure comprising rubber-coated steel cords, and these belt layers are piled so that they intersect one another at a cord angle of 10° to 25° relative to the circumferential direction of the tire. Symbol Va represents a belt layer arranged on the side of a carcass layer K, and the cord angle of this belt layer Va is set at 40° to 60° relative to the circumferential direction of the tire.

The carcass layer K comprises rubber-coated steel cords arranged in a reed screen-like shape. This carcass layer K is arranged between left and right bead wires so that the cord angle is substantially 90° relative to the circumferential direction of the tire.

In the tire shown in FIG. 9, the zigzag groove M include two zigzag grooves Mc formed in the tread center portion Ic and left and right two zigzag grooves Ms formed in the shoulder portions Ts on both the sides of the grooves Mc while leaving certain spaces from the grooves Mc. In the grooves Ms, the ratio Hs/W of the point height Hs to the tread width W is set at 2%, and in the grooves Mc, the ratio Hc/W of the point height Hc to the tread width W is set at 7%. Moreover, in the grooves Ms, the ratio Wms/W of the groove width Wms to the tread width W is set at 6%, and in the grooves Mc, the ratio Wms/W of the groove width Wmc to the tread width W is set at 5%. The ratio Pc/Ps of the pitch length Pc of the grooves Mc to the pitch length Ps of the grooves Ms is set at 2. Furthermore, the ratio Wr/W of the rib width Wr of the rib Rs on the side of the shoulder portion Ts is set at 20%, the ratio Hf/Hc is set at 21%, and the ratio Pf/Pc is set at 0.15.

Examples of experiments conducted for confirming the effects of the present invention will now be described.

The specification of tires used in the experiments and the test conditions are as follows.

Actual Vehicle Abrasion Resistance Test
Tire size: 10.00R20 14PR
Inner pressure: 7.25 kg/cm$^2$
Rim: 7.50 V×20
Load: 2500 kg
Road surface: 100% paved road Driving distance: 35000 km
Driving speed: 30–80 km/hr
Wet Braking Capacity Test
Tire size: 10.00R20 14PR
Inner pressure: 7.25 kg/cm$^2$
Rim: 7.50 V×20
Loadage: no load
Measurement method: braking distance on wet road surface was measured according to JIS D-1013

EXAMPLE 1

The relationship between the abrasion resistance and the wet braking capacity was examined by using pneumatic tires of the first embodiment in which the ratio Hs/W was 3%, the ratio Wms/W was 6%, the ratio Wmc/W was 6%, the ratio Pc/Ps was 2.0, the ratio Wr/W was 20%, the ratio Hf/Hc was 26%, and the ratio Pf/Pc was 0.21, and changing the ratio Hc/W of the point height Hc to the tread width W in the groove Mc located on the side of the tread center portion Tc.

Figure 10A:
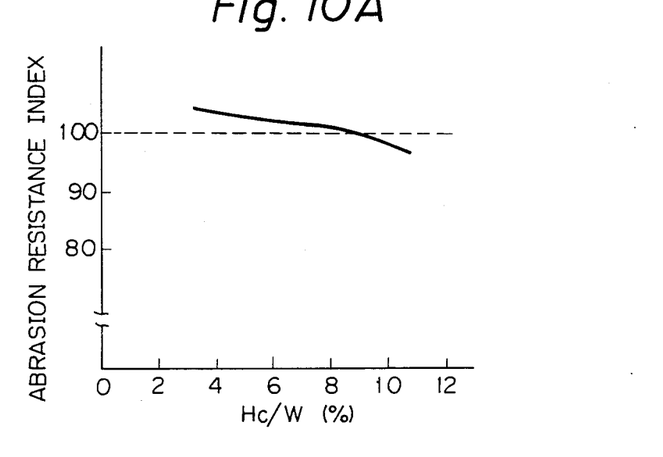
FIG. 10A is a graph illustrating the relationship between the ratio (%) of the point height Hc of the groove located on the side of the tread center portion to the tread width W and the abrasion resistance in the tire shown in FIG. 7.
Figure 10B:
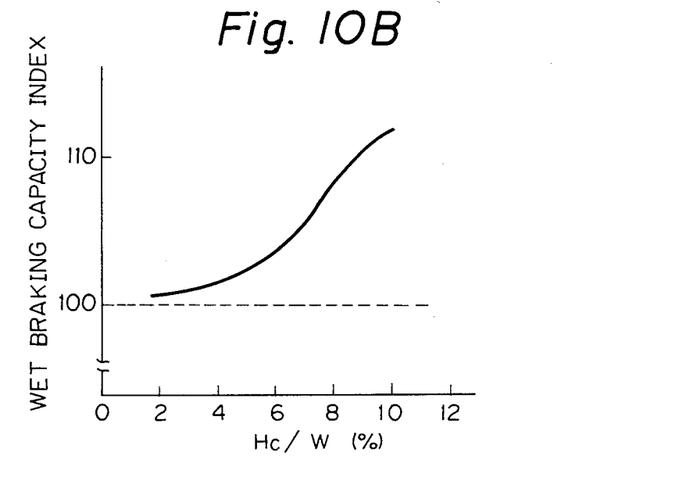
FIG. 10B is a graph illustrating the relationship between the ratio (%) of the point height Hc of the groove located on the side of the tread center portion to the tread width W and the wet braking capacity in the tire shown in FIG. 7.

The experimental results obtained are shown in FIGS. 10A and 10B.

FIG. 10A shows the relation ship between the ratio (%) of the point height Hc of the groove located on the side of the tread center portion to the tread width W and the abrasion resistance (index) in the pneumatic tire shown in FIGS. 7 and 8. FIG. 10B illustrates the relationship between the ratio (%) of the point height Hc of the groove located on the side of the tread center portion to the tread width W and the wet braking capacity (index) in the pneumatic tire shown in FIGS. 7 and 8.

From these experimental results, it is understood that if the ratio Hc/W of the point height Hc to the tread width W is lower than 6%, a prominent improvement of the wet braking capacity cannot be obtained, and if the ratio Hc/W exceeds 10%, reduction of the abrasion resistance occurs.

Accordingly, it will be understood that, in order to improve the braking capacity on a wet road, that is, the wet braking capacity, without reduction of the abrasion resistance, it is necessary that the ratio Hc/W of the point height of the groove located on the side of the tread center portion to the tread width W should be set at 6 to 10%, preferably 7 to 10%.

EXAMPLE 2

The abrasion resistance and wet braking capacity were tested by using pneumatic tires of the type shown in FIGS. 7 and 8, where the ratio Hs/W was 3%, the ratio Hc/W was 3%, the ratio Pc/Ps was 2.0, the ratio Wr/W was 20%, the ratio Hf/Hc was 26%, and the ratio Pf/Pc was 0.21, and changing the ratio of the groove width Wms of the groove Ms located on the side of the shoulder portion Ts to the tread width W and the ratio of the groove width Wmc of the groove Mc located on the side of the tread center portion Tc to the tread width W.

Figure 11A:
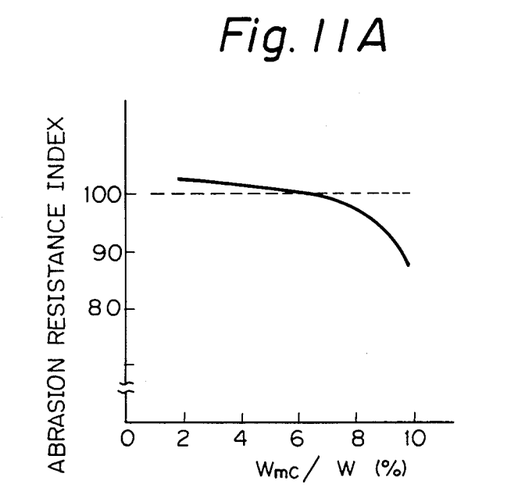
FIG. 11A is a graph illustrating the relationship between the ratio (%) of the groove width Wmc of the groove located on the side of the tread center portion to the tread width W and the abrasion resistance in the tire shown in FIG. 7.
Figure 11B:
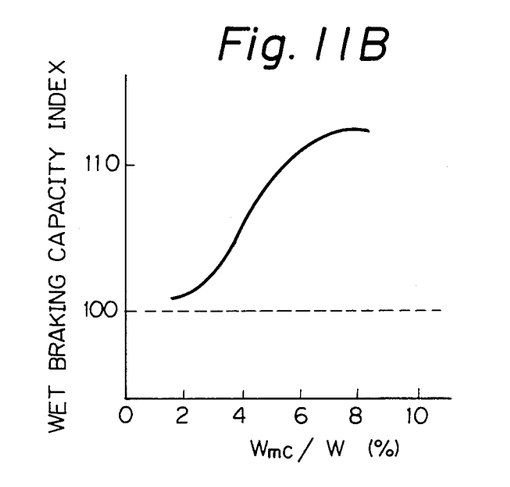
FIG. 11B is a graph illustrating the relationship between the ratio (%) of the groove width Wmc of the groove located on the side of the tread center portion to the tread width W and the wet braking capacity in the tire shown in FIG. 7.

The experimental results obtained are shown in FIGS. 11A and 11B.

FIG. 11A illustrates the relationship between the ratio (%) of the groove width Wmc of the groove located on the side of the tread center portion to the tread width W and the abrasion resistance in the above-mentioned tire, and FIG. 11B illustrates the relationship between the ratio (%) of the groove width Wmc of the groove located on the side of the tread center portion to the tread width W and the wet braking capacity in the above-mentioned pneumatic tire.

From these experimental results, it is understood that if the ratios of the groove width Wms of the groove Ms located on the side of the shoulder portion Ts and the groove width Wmc of the groove located on the side of the tread center portion Tc to the tread width W are lower than 5%, a prominent improvement of the wet braking capacity cannot be obtained, and if these ratios exceed 8%, reduction of the abrasion resistance occurs.

Accordingly, it will be understood that, in order to improve the braking capacity on a wet road, that is, the wet braking capacity, without reduction of the abrasion resistance, it is preferred that the ratios of the groove width Wms and groove width Wmc to the tread width W be set within a range of from 5 to 8%.

EXAMPLE 3

The abrasion resistance and wet braking capacity were tested by using pneumatic tires of the type shown in FIGS. 7 and 8, in which the ratio Hs/W was 3%, the ratio Hc/W was 3%, the ratio Wms/W was 6%, the ratio Wmc/W was 6%, the ratio Wr/W was 20%, the ratio Hf/Hc was 26%, and the ratio Pf/Pc was 0.21, and changing the ratio Pc/Ps of the pitch length Pc of the groove Mc located on the side of the tread center portion Tc to the pitch length Ps of the groove Ms located on the side of the shoulder portion Ts.

From the experimental results, it was found that if the ratio Pc/Ps was higher than 2.0, the abrasion resistance of the obtained tire was improved but the wet braking capacity was reduced. In contrast, if the ratio Pc/Ps was lower than 2.0, the abrasion resistance of the obtained tire was reduced and abnormal abrasion was readily caused on the rib Rc on the side of the tread center portion Tc. Accordingly, in order to obtain a tire which is excellent in both the wet braking capacity and the abrasion resistance, it is preferred that the ratio Pc/Ps be 2.0, that is, the ratio Pc/Ps of the pitch length Pc of the groove Mc located on the side of the tread center portion Tc to the pitch length Ps of the groove Ms located on the side of the shoulder portion Ts be 2.

As is apparent from the foregoing description, in the pneumatic tire of the present invention, at least 3 zigzag grooves continuous in the circumferential direction of the tire are formed on the tread surface of the tire while leaving spaces in the lateral direction, and of these zigzag grooves, the groove located on the side of the shoulder portion is characterized in that the ratio of the point height Hs to the tread width W is set at 2 to 4% and the groove located on the side of the tread portion is characterized in that the ratio of the point height Hc to the tread width W is set at 6 to 10%. By dint of this characteristic feature, according to the present invention, the wet braking capacity can be improved without reduction of the abrasion resistance of the tire.

I claim:

1. A pneumatic tire having at least three zigzag grooves continuous in the circumferential direction of the tire, which are formed on the tread surface of the tire while leaving spaces in the lateral directions, wherein in the zigzag groove located on the side of the shoulder portion, the ratio of the point height Hs to the tread width W is in the range of from 2% to 4%, and in the zigzag groove located on the side of the tread center portion, the ratio of the point height Hc to the tread width W is in the range of from 6% to 10%, each of the ratio of the groove width Wms of the groove located on the side of the shoulder portion to the tread width W and the ratio of the groove width Wmc of the groove located on the side of the tread center portion to the tread width W being in the range of from 5% to 8%.

* * * * *